US00RE39998E

(19) United States
(12) Reissued Patent
Francois

(10) Patent Number: US RE39,998 E
(45) Date of Reissued Patent: Jan. 8, 2008

(54) COMPOSITE WEAR COMPONENT

(75) Inventor: Hubert Francois, Ans (BE)

(73) Assignee: Magotteaux International S.A., Vaux-Sous-Chevremont (BE)

(21) Appl. No.: 10/448,004

(22) PCT Filed: Aug. 27, 1997

(86) PCT No.: PCT/EP97/04762

§ 371 (c)(1),
(2), (4) Date: Jun. 1, 1999

(87) PCT Pub. No.: WO98/15373

PCT Pub. Date: Apr. 16, 1998

Related U.S. Patent Documents

Reissue of:
(64) Patent No.: 6,399,176
Issued: Jun. 4, 2002
Appl. No.: 09/269,723
Filed: Jun. 1, 1999

(30) Foreign Application Priority Data

Oct. 1, 1996 (EP) ..... 96202741
Jul. 4, 1997 (EP) ..... 97870099

(51) Int. Cl.
*B24D 3/34* (2006.01)
*F16J 9/00* (2006.01)

(52) U.S. Cl. ..... 428/67; 428/539.5; 428/545; 428/610; 428/614; 428/615; 428/457; 428/472; 428/702; 92/129; 51/307

(58) Field of Classification Search ..... 428/67, 428/539.5, 545, 610, 614, 615, 457, 472, 428/702; 92/129; 51/307
See application file for complete search history.

(56) References Cited

U.S. PATENT DOCUMENTS 3,181,939 A 5/1965 Marshall et al.
4,586,663 A 5/1986 Bartley
4,595,663 A 6/1986 Krohn et al.

(Continued)

FOREIGN PATENT DOCUMENTS

DE 702385 1/1941
DE 702385 2/1941
DE 1949777 10/1970

(Continued)

OTHER PUBLICATIONS

Patent Abstracts of Japan, vol. 12, No. 171, May 21, 1988 and JP62286661A (Kawasaki Heavy Ind. Ltd.), Dec. 12, 1987.

Patent Abstracts of Japan, vol. 17, No. 635, Nov. 25, 1993 and JP05200526 (Mitsubishi Heavy Ind. Ltd.), Aug. 10, 1993.

Patent Abstracts of Japan, vol. 9, No. 286, Nov. 13, 1985 and JP60127067 (Kubota Tekko KK), Jul. 6, 1985.

Patent Abstracts of Japan, vol. 12, No. 73, Mar. 8, 1988 and JP62214863 (Nippon Chuzo KK), Sep. 21, 1987.

(Continued)

*Primary Examiner*—Jennifer McNeil
*Assistant Examiner*—Jason Savage
(74) *Attorney, Agent, or Firm*—Fitch, Even, Tabin & Flannery

(57) ABSTRACT

Composite wear component produced by casting and consisting of a metal matrix whose working face or faces includes inserts which have a very high wear resistance, characterized in that the inserts consist of a ceramic pad, this ceramic pad consisting of a homogeneous solid solution of 20 to 80% of $Al_2O_3$ and 80 to 20% of $ZrO_2$, the percentages being expressed by weights of the constituents, and the pad then being impregnated with a liquid metal during the casting.

22 Claims, 1 Drawing Sheet

U.S. PATENT DOCUMENTS

| | | | |
|---|---|---|---|
| 4,787,564 | A | 11/1988 | Tucker |
| 4,940,188 | A | 7/1990 | Rodriguez et al. |
| 4,997,461 | A | 3/1991 | Markhoff-Matheny et al. |
| 5,184,784 | A | 2/1993 | Rose et al. |
| 5,435,234 | A | 7/1995 | Bentz et al. |
| 5,551,963 | A | 9/1996 | Larmie |
| 5,855,701 | A | 1/1999 | Bonnevie |
| 6,221,184 | B1 | 4/2001 | Bonnevie |

FOREIGN PATENT DOCUMENTS

| | | | |
|---|---|---|---|
| DE | 7326661 | | 11/1973 |
| DE | 2335588 | | 3/1975 |
| DE | 10421928 | * | 11/2002 |
| EP | 0838288 | A1 | 4/1988 |
| EP | 0476496 | | 3/1992 |
| EP | 0575685 | | 12/1993 |
| EP | 0930948 | B1 | 4/1998 |
| EP | 0841990 | B1 | 5/1998 |
| EP | 841 990 | B1 | 8/1999 |
| EP | 1530965 | | 5/2005 |
| JP | 60127067 | | of 1985 |
| JP | 62286661 | * | 4/1986 |
| JP | 62286661 | | of 1988 |
| JP | 01-289558 | * | 11/1989 |
| JP | 5200526 | | of 1993 |
| WO | PCT/WO9831467 | | 7/1998 |
| WO | PCT/WO9845486 | | 10/1998 |
| WO | PCT/WO9947264 | | 9/1999 |

OTHER PUBLICATIONS

Patent Abstracts of Japan, vol. 14, No. 469, Oct. 12, 1999 and JP02187250 (Kurimoto Ltd.), Jul. 23, 1990.

W. Gerhartz et al, Ullman's Encyclopedia of Industrial Chemistry, Weinheim, Fifth Edition XP002023826, vol. A, p. 5.

Publication entitled "An Investigation of Metal Penetration In Steel Sand Cores", by S.L. Gertsman and A.E. Morton, (9 pgs).

Publication entitled "Metal Penetration and Sand Adherence" in Journal of the Association, Dec., 1952, (8 pgs).

Publication entitled "On The Interface Reactions of Chromite, Olivine and Quartz Sands With Molten Steel", by Paavo Asanti, Otaniemi, Finland, AFS Cast Metals Research Journal, vol. 4, 1968, (7 pgs.).

Publication entitled "The $Co_2$–Silicate Process in Foundries", (group of 2) by K.E. L. Nicholas, British Cast Iron Research Assoc., Birmingham, England, 1972, (15 pgs.).

Publication entitled "AFS–Modern Casting New Technology Seminar on Sodium Silicate Binders", American Foundrymen's Society Tech Report; No. 7419, Sep., 1974, Speaker, K.E.L. Nicholas, Jun. 27, 1974, (21 pgs.).

Publication entitled "Space–Related Composite–Material Experiments", by S. Kaye, J. Vac. Sci. Technol., vol. 11, No. 6, Nov./Dec. 1974, (4 pgs.).

Publication entitled "Einfluss Von Auf Die Oberflächenspannung Von Stahlschmelzen", by Osama M. Abd El–Wahab, el Giza (VAR Ägypten), Helmut Burghardt and Hanz–Joachim Eckstein, Neue Hütte, 20. Jg. Heft 7, Juli 1975, (3 pgs.).

Publication entitled "Strengthening of Steel by the Method of Spraying Oxide Particles into Molten Steel Stream", by Masayoshi Hasegawa and Kazuhiko Takeshita, 1978 American Society for Metals and the Metallurgical Society of Aime, vol. 9B, Sep. 1978–383, (6 pgs.).

Publication entitled: Phenomenes Chimiques Interfaciaux Contribuant a l'Abreuvage en Fonderie de Fonte, by M. Onillon, J. Perrin, J. Rebaudieres and H. de Roulhac, Hommes Et Fonderie, Janvier, 1980, (5 pgs.).

Publication entitled Untersuchung Der Penetration Von Stahlschmeizen Aus G–X70 Cr29 Und G–X15 CrNiSi25 20 In Furanharzgebundene Formstoffe Auf Chromitsandbasis–Teil 1, by Karl Eugen Höner and Paul Werner Nogossek, Berlin, Giesserei–Forschung, vol. 35 Jahgang 1982, Heft 2, (11 pgs).

Publication entitled Untersuchung Der Penetration Von Stahlschmeizen Aus G–X70 Cr29 Und G–X15 CrNiSi25 20 In Furanharzgebundene Formstoffe Auf Chromitsandbasis–Teil 1, by Karl Eugen Höner and Paul Werner Nogossek, Berlin, Giesserei–Forschung, vol. 35 Jahgang 1982, Heft 2, (11 pgs).

Publication entitled "Cast–In–Place Hardfacing", by K.G. Davis and J.G. Magny, American Foundrymen's Society, Transactions, Vol. 89, Cincinnati, OH, Apr. 27–May 1, 1981, published 1982, (17 pgs).

Publication entitled "Compatibility between Carbon Fibre and Binary Aluminium Alloys", by Yoshinobu Kimura, Yoshinao Mishima, Sokichi Umekawa and Tomoo Suzuki, Journal of Materials Science, vol. 19, 1984, (8 pgs.).

Publication entitled "2000 Advanced Ceramics Toughen up Their Act", by Robert R. Irving, Iron Age, May 3, 1985, (5 pgs.).

Publication entitled "Application of Cast–On Ferrochrome–Based Hard Surfacings to Polystyrene Pattern Castings", by J.S. Hansen, R.R. Jordan, S.J. Gerdemann and G.F. Soltau, U.S. Bureau of Mines, Albany, OR, 1985, published by U.S. Dept. of Commerce National Technical Information Service, (27pgs.).

Publication entitled "New Sprayable Ceramic Fiber With Special Binder Provides Economical System For Insulating Furances", by Jerry Barrows, Industrial Heating, Apr., 1985, (3 pgs.).

Publication entitled "High–Alloy White Irons", by R.B. Gundlach, ASM Handbook, vol. 15, Casting, 1988. (8pgs.).

Publication entitled "Composites a Matrice Metallique: Des Supermetaux", l'Usine Nouvelle, Dec. 1987 (4 pgs.).

Publication entitled "Réalisation Par Moulage De Piéces Bimétalliques Pour Application Á Des Problémes De Corrosion Ou D'Abrasion", by P.Poyet, E. bollinger, F. Elsen, P. Guillermin and P. Guiraldenq, Hommes Et Fonderie, Avril, 1987 (7 pgs.).

Publication entitled "Modeling of Infiltration Kinetics For Liquid Metal Processing of Composites", by G.P. Martins, D.L. Olson and G.R. Edwards, Metallurgical Transactions B, vol. 19B, Feb. 1988–95, (6 Pgs.).

Publication entitled "Cast Metal–Matrix Composites", by Pradeep Rohatgi, Metals HandbookCasting, $9^{th}$ ed., vol. 15, ASM International, 1988, (15 pgs.).

Publication entitled "The Prospects for Advanced Polymer–Metal–And Ceamic–Matrix Composites", by Thomas Abraham, Richard W. Bryant and Peter J. Mooney, Journal of Metals, Nov. 1988, (5 pgs.).

Publication entitled "Advances in Cast Metal Composites", by Steven G. Fishman, Journal of Metals, Nov., 1988, (2 pgs.).

Publication entitled "Ceramic Composites Emerging As Advanced Structural Materials", by Ron Daganl, News Focus, Feb. 1, 1988, (6 pgs.).

Publication entitled "Introduction Sur Les Céramiques Techiques Modernes Propriétés–Stabilité* Premiére Partie", by P. Tassot La Revue de Metallurgie–CIT, Janvier, 1988, (10 pgs.).
Publication entitled " Les Nouvelles Céramiques", Athena N' 55, Novembre, 1989 (9 pgs.).
Publication entitled "Metal–Based Materials Strengthen Structures", Tom Shelley reports, Eureka Transfers Technology, Nov. 7, 1990, (3 pgs.).
Publication entitled "Mechanisms of Metal Penetration in Foundry Molds" , by J.M. Svoboda, Ninety–Eighth Annual Meeting of the American Foundrymen's Society, May, 1994, (8 pgs.).
Publication entitled "Semisolid Metal Casting and Forging", by Malachi P. Kenney, James A. Courtois, Robert D. Evans, Gilbert M. Farrior, Curtis P. Kyonka, Alan A. Koch, and Kenneth P. Young, Metals Handbook, 9$^{th}$ Edition, vol. 15, 1998, (13 pgs.).
Article entitled "Processes" and "Materials", New Products International, (2 pgs.).
Article entitled "Fused Zirconia–Aluminas", (1 pg.).
Publication entitled "Uni–Bond Silicates" (18 pgs.).
Publication entitle Céramiques Renforcées Par De l'Oxyde De Zirconium Et Résistantes Ál'usure by O. Toft Sorensen, (3 pgs.).
Publication entitled "The Interface Phase in Al–Mg/$A1_2O_3$ Composites", by A. Munitz, M. Metzger, and R. Mehrabian, 1979 American Society for Metals and the Metallurgical Society of Aime, vol. 10A, Oct. 1979–1491, (7 pgs.).
Publication entitled "A Look Into the Future: Wider Application of The Sodium Silicate–Carbon Dioxide Process Through a Better Understanding of The Basic Principles and The New Technology", by J. Gotheridge, published in AFS Transactions, 1980, from the 83$^{rd}$ Annual Meeting; Birmingham, AL, Apr. 30–May 4, 1979, (37 pgs.).
Publication entitled "Marching Into The New Stone Age", by H. Garrett DeYoung, High Technology, Aug. 1985, (3 pgs.).
Publication entitled "Ion Implantation in Metals and Ceramics", by C.J. McHargue, International Metals Reviews, 1986, vol. 31, No. 2, (26 pgs.).
Publication entitled "Chemically Bonded Cores & Molds, An Operator's Manual For The Use of Chemically Bonded, Self–Setting Sand Mixtures", American Foundrymen's Society, Inc., 1987, (100 pgs.).
Publication entitled "Ceramics II", by James A. Spirakis, Advanced Materials & Processes Inc., Metal Progress, Mar. 1987, (4 pgs.).
Publication entitled "On The Interface Reactions of Chromite, Olivine and Quartz Sands with Molten Steel", by Paavo Asanti, Otaniemi, Finland, AFS Cast Metals Research Journal, vol. 4, 1968, (8 pgs.).

* cited by examiner

COMPOSITE WEAR COMPONENT

Matter enclosed in heavy brackets [ ] appears in the original patent but forms no part of this reissue specification; matter printed in italics indicates the additions made by reissue.

SUBJECT OF THE INVENTION

The present invention relates to a composite wear component produced by casting and consisting of a metal matrix whose wear face comprises inserts which have good wear resistance properties.

TECHNOLOGICAL BACKGROUND UNDERLYING THE INVENTION

The invention relates especially to wear components employed in plants for grinding, crushing and conveying various abrasive materials which are encountered in industries such as cement factories, mines, metallurgy, electricity generating stations or various quarries. These components are often subjected to high mechanical stresses in the bulk and to a high wear by abrasion at the working face. It is therefore desirable that these components should exhibit a high abrasion resistance and some ductility, to be able to withstand the mechanical stresses such as impacts and to be capable optionally of being mechanical.

Given that these two properties are difficult to reconcile with one another in the same material, composite components have already been proposed which have a core made of relatively ductile alloy in which isolated inserts which have a good wear resistance are embedded.

Document EP-A-0476496 proposes this technique for the production of grinding wheels whose working face has set-in inserts made of chrome pig iron.

Since it is known that ceramic materials have good abrasion resistance properties, it is also known to employ these materials for improving the abrasion resistance of wear components.

Document EP-A-0575685 proposes the use of ceramic materials in a moulding by lost-wax precision casting of small wear components.

This well-known process employs wax models which must be melted to obtain the mould cavity which must be filled with metal; this mould itself is made of ceramic and not of a conventional sand.

According to this document a ceramic pad (wafer core) is formed first, with a spongy structure which has a three-dimensional network of open pores all of which communicate with one another. This ceramic pad is formed by pouring grains of ceramic materials into an appropriate mould and, next, a liquid adhesive with a good fluidity, for example a liquid resin which, after curing, retains the grains to form the ceramic structure. The ceramic material may consist of aluminium oxide or of zirconium oxide. After having been pre-impregnated with wax, this pad is placed in a mould intended to produce the wax model of the component. The wax model is then case and, lastly, the ceramic mould is produced by dipping the wax model in a ceramic slurry. The ceramic mould containing the wax model is then heated so as to melt the wax model. The wax thus flows from the ceramic mould but the pads inserted beforehand in the wax model remain adhesively bonded to the walls of the ceramic mould.

For the casting of metal in the ceramic mould the latter is preheated to a temperature of the order of 1150° C., generally under vacuum.

This known technique is limited, however, to lost-wax precision moulding. Moreover, the compatibility between the metal matrix and the ceramic structure, especially in terms of temperature behaviour, presents hardly any problems in the case of the applications mentioned in this document, given that, when the metal is being cast, the mould and the ceramic structure are preheated to a high temperature. In addition, the technique is limited to the production of very precise special components, which are sold at a very high price because the lost-wax moulding process itself is very costly.

The document "Ullmann's Encyclopedia of Industrial Chemistry" (1985), W. Gerhartz, VCH Verslagsgesellschaft, $5^{th}$ Edition XP002023826, page 5 mentions compositions based on $Al_2O_3$—$ZrO_2$ for grinding devices intended for conditioning cast products (billets and slabs).

PROBLEMS UNDERLYING THE INVENTION

The technique described above cannot as such be adapted to the manufacture of wear components of larger dimensions for application such as those encountered in plants for grinding, crushing or conveying abrasive materials, where the components generally have sections of at least 25 mm and often larger than 40 mm.

In addition, in accordance with the technique of the present invention it is not possible to cast, or at least it is difficult to envisage casting, components with thin sections, for example of less than 25 mm, because neither the mould nor the ceramic insert is preheated to high temperature before the metal is cast.

Furthermore, the component usually undergoes a subsequent heat treatment. There must therefore be some compatibility from the viewpoint of temperature behaviour between the ceramic material and the metal, to avoid cracking due to the thermal shocks when liquid metal is being cast over the ceramic inserts, and those that can be produced during the subsequent heat treatment and caused by the different expansion coefficients of both these materials.

It is necessary, furthermore, that the mechanical properties of the ceramic material should be adapted to those of the metal in order to produce a component whose properties correspond to the requirements of the specific application for which it is intended.

The aim of the present invention is to provide a composite wear component with ceramic inserts satisfactorily corresponding to the requirements listed above.

A second problem arises from the fact that, above a thickness of 25 mm of the ceramic material, poor infiltration of the metal is observed. Another objective of the present invention is to solve this second problem by proposing specific geometries of the composite wear component.

MAIN CHARACTERISTIC ELEMENTS OF THE INVENTION

To meet the first objective the invention proposes a composite wear component produced by conventional or centrifugal casting. It consists of a metal matrix whose wear surface comprises inserts which have good abrasion resistance properties, these inserts being made of a ceramic material, itself composite, consisting of a solid solution or homogeneous phase of 20 to 80% of $Al_2O_3$ and 80 to 20% or $ZrO_2$, the percentages being expressed by weights of constituents.

The ceramic material may additionally contain other oxides whose proportion by weight does not exceed 3 to 4%.

According to a first preferred embodiment of the present invention the composition of the ceramic material is the following:

55–60% by weight of $Al_2O_3$, and

38–42% by weight of $ZrO_2$.

According to another preferred embodiment the composition of the ceramic material is the following:

70–77% by weight of $Al_2O_3$, and

23–27% by weight of $ZrO_2$.

*According to another preferred embodiment, the composition of the ceramic material consists of the following:*

*55 to 60% by weight of $Al_2O_3$ and from 40 to 45% by weight of $ZrO_2$.*

*According to another preferred embodiment, the composition of the ceramic material consists of the following:*

*70 to 77% by weight of $Al_2O_3$ and from 23 to 30% by weight of $ZrO_2$.*

The content of ceramic materials in the insert is between 35 and 80% by [weight]*volume*, preferably between 40 to 60% and advantageously of the order of 50%.

This composite ceramic material is produced from an aggregate of ceramic grains which have a particle size within the range F6 to F22 according to the FEPA standard, that is to say a diameter of between approximately 0.7 mm and 5.5 mm. These ceramic grains are manufactured in a conventional way, by electrofusion, by sintering, by flame spraying or by any other process allowing the two constituents to fuse.

The ceramic grains are aggregated with the aid of an adhesive, the proportion of which does not exceed 4% by weight relative to the total weight of the pad and is preferably between 2 and 3% by weight. This adhesive may be inorganic or organic. An adhesive based on a silicate or an adhesive which is in the form of epoxy resin may be mentioned by way of example.

The invention is based on the finding that aluminium oxide (corundum) and zirconium oxide have relatively different properties and this makes it possible, by a judicious choice within the abovementioned ranges, to adjust the hardness, the toughness and the thermal expansion coefficient of the ceramic composite so as to combine a good hardness and a good toughness; and to make it compatible with the precise application for which the component is intended, on the one hand, and to obtain, on the other hand, an expansion coefficient of the composite ceramic which is close to that of the casting metal chosen, that is to say of the pig iron or of the steel which has an expansion coefficient of between $10\times10^{-6}$ and $11\times10^{-6}$.

Zirconium oxide has the advantage of having an expansion coefficient which is close to that of the metal. In addition, it contributes to good toughness, that is to say that it reduces the risks of breakage.

Aluminium oxide, for its part, contributes to good hardness. Within the pads the zirconium particles present in the alumina make it possible to increase the resistance of the latter to cracking and thus to obtain a toughness greater than that of each of the components considered in isolation, namely $ZrO_2$ or $Al_2O_3$.

In other words, in the wear components which are subjected to strong abrasion it is advantageous to increase the proportion of aluminium oxide, not exceeding, however, a certain limit beyond which the abrasion resistance and the toughness begin to decrease. In this case the second range is rather chosen for the ceramic composition.

On the other hand, in the case of the components which are subjected to considerable impacts or to high pressures, it is advantageous to give preference to the expansion coefficient at the expense of hardness and to increase the proportion of zirconium oxide in order to decrease the stresses in the component and, consequently, the risks of breakage.

In the case of the components where there is a risk of cracking during the casting or during the subsequent heat treatment it is also advantageous to increase the proportion of zirconium oxide, to bring the expansion coefficient of the insert nearer to that of the metal matrix.

The choice of the proportions of the constituents of the composite ceramic insert may, of course, also take into account the composition of the casting metal with a view to the properties required by the application for which the component is intended. Similarly, the choice of the composition of the casting metal may be adapted to the nature of the composite insert.

Various geometries are proposed within the scope of the present invention in order to solve the problem of the poor infiltration of the liquid metal within the ceramic phase.

In the particular case where the thickness of the pad made of ceramic material becomes considerable, two or more superposed pads made of ceramic material will be proposed, according to a first embodiment, these being kept separated by a minimum gap of the order of 10 mm in order to permit the arrival of the liquid metal. This makes it possible thus to obtain correct infiltration of the various pads. In this way an appreciable increase in the proportion of the ceramic phase within the insert is obtained without being confronted with the problem of the poor infiltration by the metal.

According to another embodiment it will be proposed to produce the pad rather in the form of a "honeycomb" structure which includes various elementary cells exhibiting a polygonal or circular shape within the ceramic phase. The thickness of the walls of the various cells constituting the ceramic phase preferably varies between 5 and 25 mm.

Once again, this embodiment makes it possible to increase the quantity of the ceramic phase without, however, risking the problem of poor infiltration of the liquid metal in the case of a component whose wear takes place more particularly in depth.

Once again, the advantage lies in the fact that the walls do not exceed the limiting thickness for infiltration of the liquid metal, which is approximately 25 mm, but with a height that is practically equal to the height of the composite component. In addition, on proposing this second embodiment of the pad in the "honeycomb" form, the improvement in the grinding process is observed. In fact, after a certain period of service, hollow pits are created in the cellular metal part, which then fill with material to be ground and thus ensure that they play a part in self-protection against wear. This profile advantageously makes it possible to avoid the creation of preferential wear paths by the ground material, reflected in a drop in output rate in the case of the mills. It is noted, moreover, that this structure in the "honeycomb" form according to the second preferred embodiment makes it possible to reduce the risk of propagation of the cracks that could develop in the infiltrated pad during the production of the component. In fact, the splits which might be formed are then closed onto themselves and do not propagate within the whole component.

EXAMPLES

Example 1

Manufacture of an Ejector for a Crusher with a Vertical Shaft

A mixture of 75% of $Al_2O_3$ and 23% of $ZrO_2$ is made up, the two constituents of which are fused by electrofusion to form composite grains of a particle size included in the categories F6 to F20 of the FEPA standard. These grains are then poured into a mould of appropriate shape with a liquid adhesive which, after curing, holds the grains together to form a ceramic pad.

Figure 1:
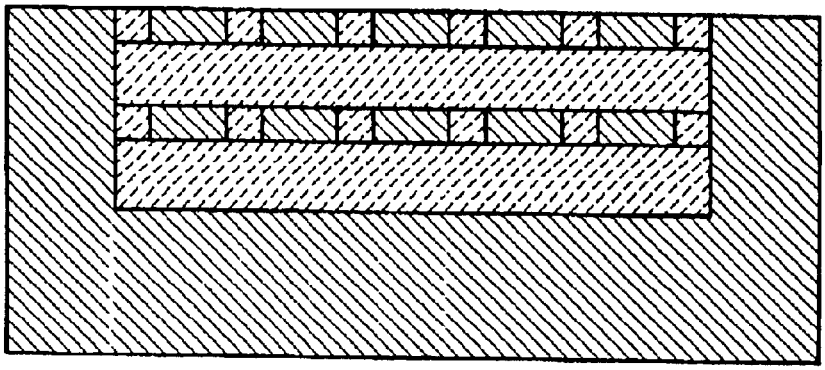
FIG. 1 describes a composite wear component according to a first preferred embodiment of the present invention*with FIG. 1 being a sectional view.*

In this particular example it is recommended to employ the configuration shown in FIG. 1, which takes two ceramic pads *1* which are superposed and leaving a 10 mm gap between them. [These] *Ceramic* pads *1* are placed in an appropriate mould, preferably made of sand, into which is next cast a liquid pig iron *2* including 3% or carbon, 26% of chromium and other conventional elements in a small proportion which is always encountered in alloys of this type. A wear component is thus produced with ceramic inserts *1* with a hardness of the order of 1600 Hv with an expansion coefficient close to $8\times10^{-6}$, held in a pig iron matrix *2* with a hardness close to 750 Hv.

Example 2

Manufacture of a Crusher Rotor

The ceramic material is prepared as in Example 1 but this time choosing a composition which gives preference to the expansion coefficient at the expense of hardness, that is to say by taking 40% of $ZrO_2$ and 60% of $Al_2O_3$.

Given that the thickness is particularly considerable in this kind of component, a "honeycomb" form configuration is employed, as shown in FIG. 2, *which is formed of ceramic inserts 1 and cast metal 2*. In this case the structure is in the form of a "honeycomb" whose cells have walls the thickness of which is approximately 20 mm and the height of which is practically equal to the height of the composite component. This structure is produced with the aid of a manganese steel with a composition of 1% of carbon, 14% of manganese and 1.5% of molybdenum.

A composite component is thus produced with a hardness of approximately 1350 Hv with an expansion coefficient close to $9\times10^{-6}$. The objective here is to decrease the risk of splits in the component because of the high impact level to which this type of component is subjected.

Example 3

Beater

Figure 3:
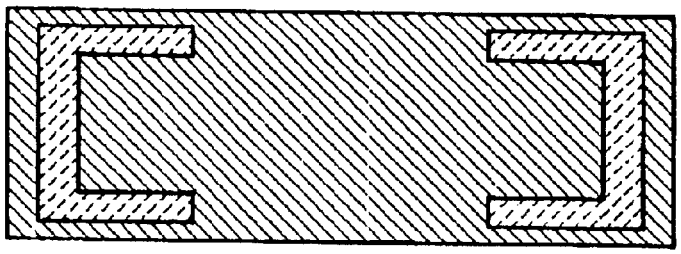
FIG. 3 describes a particular application for a composite wear component according to the present invention.
Figure 1:
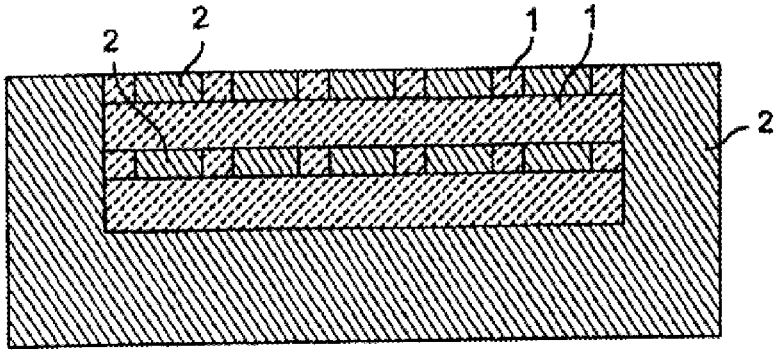
Figure 2A:
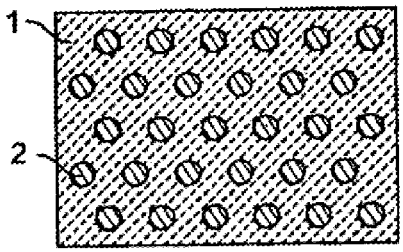
Figure 2B:
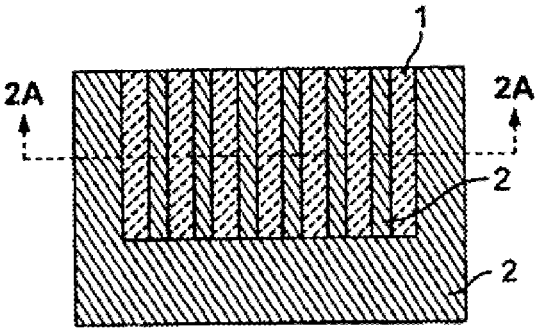
Figure 3:
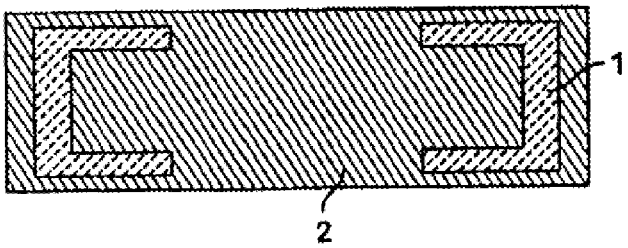

FIG. 3 shows an example of a ceramic pad employed for an application in beaters, which allows the three wear phases of the beater to be strengthened. The ceramic pad *1* is a single component situated within the metal phase *2*.

What is claimed is:

1. Composite wear component produced by classical or centrifugal casting and consisting of a metal matrix having a working face or faces including inserts which have wear resistance, *wherein* the inserts consist of a porous ceramic pad, the porous ceramic pad consisting of a homogeneous [solid solution] *ceramic composite* of 20 to 80% of $Al_2O_3$ and 80 to 20% of $ZrO_2$, the percentages being expressed by weights of the constituents, and the porous ceramic pad being integrated into the metal matrix by impregnation of a liquid metal in the porous ceramic pad during the casting.

2. Composite wear component according to claim 1, wherein the ceramic material includes from 55 to 60% by weight of $Al_2O_3$ and from [38 to 42%] *40 to 45*% by weight of $ZrO_2$.

3. Composite wear component according to claim 1, wherein the ceramic material includes from 70 to 77% by weight of $Al_2O_3$ and from 23 to [27] *30*% by weight of $ZrO_2$.

4. Composite wear component according to claim 1, wherein the content of ceramic materials in the insert is between 35 and 80% by [weight] *volume*.

5. Composite wear component according to claim 1, wherein the inserts consist of an aggregate of composite ceramic grains which have a particle size within the range F6 to F22 according to the FEPA standard.

6. Composite wear component according to claim [1] *5*, wherein the ceramic grains are manufactured by one of electrofusion, sintering and flame spraying.

7. Composite wear component according to claim [1] *5*, wherein the ceramic grains are joined integrally with the aid of an inorganic or organic liquid adhesive prior to the casting with the liquid metal [with a view to the production of the ceramic pad].

8. Composite wear component according to claim 7, wherein the pad does not contain more than 4% of adhesive.

9. Composite wear component *according to claim 1* produced by casting and composed of a metal matrix including [at least one ceramic pad, and] at least two ceramic pads [are placed side by side] *superposed*, leaving a gap of the order of 10 mm in order to permit the arrival of the liquid metal.

10. Composite wear component produced by classical or centrifugal casting according to claim 1 and made up of a metal matrix including a wear-resistant ceramic pad, *wherein* the ceramic pad is in the form of a honeycomb structure in which the various cells are of polygonal or circular shape within the ceramic phase.

11. Composite wear component according to claim 10, wherein a thickness of walls of the various cells constituting the ceramic phase varies from 5 to 25 mm.

*12. Composite wear component produced by classical or centrifugal casting, said composite wear component comprising*

*a metal matrix having a working face or faces including inserts which have wear resistance, the inserts include a porous ceramic pad, the porous ceramic pad comprises a homogeneous solid solution of 20 to 80% of $Al_2O_3$ and 80 to 20% of $ZrO_2$, the percentages being expressed by weights of the constituents, and the porous ceramic pad being integrated into the metal matrix by impregnation of a liquid metal in the porous ceramic pad during the casting.*

*13. Composite wear component according to claim 12, wherein the ceramic material includes from 55 to 60% by weight of $Al_2O_3$ and from 38 to 42% by weight of $ZrO_2$.*

*14. Composite wear component according to claim 12, wherein the ceramic material includes from 70 to 77% by weight of $Al_2O_3$ and from 23 to 27% by weight of $ZrO_2$.*

*15. Composite wear component according to claim 12, wherein the content of ceramic materials in the insert is between 35 and 80% by weight.*

*16. Composite wear component according to claim 12, wherein the inserts include an aggregate of composite ceramic grains which have a particle size within the range F6 to F22 according to the FEPA standard.*

*17. Composite wear component according to claim 16, wherein the ceramic grains are manufactured by one of electrofusion, sintering and flame spraying.*

*18. Composite wear component according to claim 16, wherein the ceramic grains are joined integrally with the aid of an inorganic or organic liquid adhesive prior to the casting with the liquid metal.*

*19. Composite wear component according to claim 18, wherein the pad does not contain more than 4% of adhesive.*

*20. Composite wear component produced by classical or centrifugal casting according to claim 12 and made up of a metal matrix including a wear-resistant ceramic pad, wherein the ceramic pad is in the form of a honeycomb structure in which the various cells are of polygonal or circular shape within the ceramic phase.*

*21. Composite wear component according to claim 20, wherein a thickness of walls of the various cells constituting the ceramic phase varies from 5 to 25 mm.*

*22. Composite wear component accordint to claim 12 produced by casting and composed of a metal matrix including at least two ceramic pads superposed, leaving a gap of the order of 10 mm in order to permit the arrival of the liquid metal.*

* * * * *

UNITED STATES PATENT AND TRADEMARK OFFICE

CERTIFICATE OF CORRECTION

PATENT NO. : RE 39,998 E
APPLICATION NO. : 10/448004
DATED : January 8, 2008
INVENTOR(S) : Hubert Francois It is certified that error appears in the above-identified patent and that said Letters Patent is hereby corrected as shown below:

The Title Page, showing an illustrative figure, should be deleted and substitute therefor the attached title page.

Delete Drawing Sheet 1, and substitute therefor the Drawing Sheet, consisting of Fig. 1-3, as shown on attached pages.

Figure 2A:
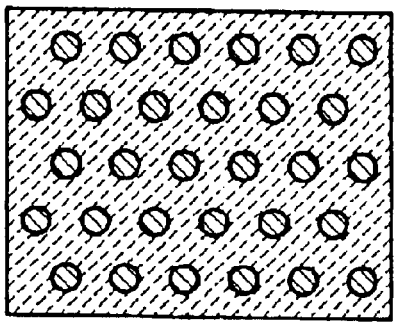
FIGS. 2A and 2B describe a composite wear component according to a second embodiment of the present invention with FIG. 2B being a sectional view taken along line [2B—2B]⇆ *21—21* of FIG. 2A.
Figure 2B:
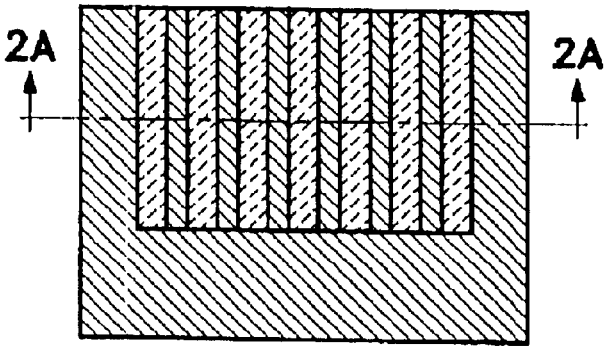

In the drawings, in FIGS. 1, 2A, 2B, and 3, the reference numbers 1 and 2 should be applied to the figures and the cut line of FIG. 2B should be dashed.

At col. 6, l. 45, replace "a porous ceramic pad, the porous ceramic pad" with the following:

--a porous ceramic pad, wherein the porous ceramic pad--

At col. 6, l. 46, replace "a homogeneous solid solution of 20 to" with the following:

--a homogeneous ceramic composite 20 to--

Signed and Sealed this

Twenty-second Day of July, 2008

JON W. DUDAS
*Director of the United States Patent and Trademark Office*

(19) United States
(12) Reissued Patent
Francois

(10) Patent Number: US RE39,998 E
(45) Date of Reissued Patent: Jan. 8, 2008

(54) COMPOSITE WEAR COMPONENT

(75) Inventor: Hubert Francois, Ans (BE)

(73) Assignee: Magotteaux International S.A., Vaux-Sous-Chevrement (BE)

(21) Appl. No.: 10/448,004

(22) PCT Filed: Aug. 27, 1997

(86) PCT No.: PCT/EP97/04762

§ 371 (c)(1),
(2), (4) Date: Jun. 1, 1999

(87) PCT Pub. No.: WO98/15373

PCT Pub. Date: Apr. 16, 1998

Related U.S. Patent Documents

Reissue of:
(64) Patent No.: 6,399,176
Issued: Jun. 4, 2002
Appl. No.: 09/269,723
Filed: Jun. 1, 1999

(30) Foreign Application Priority Data

Oct. 1, 1996 (EP) ..... 96202741
Jul. 4, 1997 (EP) ..... 97870099

(51) Int. Cl.
*B24D 3/34* (2006.01)
*F16J 9/00* (2006.01)

(52) U.S. Cl. ..... 428/67; 428/539.5; 428/545; 428/610; 428/614; 428/615; 428/457; 428/472, 428/702; 92/129; 51/307

(58) Field of Classification Search ..... 428/67, 428/539.5, 545, 610, 614, 615, 457, 472, 428/702; 92/129; 51/307
See application file for complete search history.

(56) References Cited

U.S. PATENT DOCUMENTS 3,181,939 A 5/1965 Marshall et al.
4,586,663 A 5/1986 Bartley
4,595,663 A 6/1986 Krohn et al.

(Continued)

FOREIGN PATENT DOCUMENTS

DE 702385 1/1941
DE 702385 2/1941
DE 1949777 10/1970

(Continued)

OTHER PUBLICATIONS

Patent Abstracts of Japan, vol. 12, No. 171, May 21, 1988 and JP62286661A (Kawasaki Heavy Ind. Ltd.), Dec. 12, 1987.

Patent Abstracts of Japan, vol. 17, No. 635, Nov. 25, 1993 and JP05200526 (Mitsubishi Heavy Ind. Ltd.), Aug. 10, 1993.

Patent Abstracts of Japan, vol. 9, No. 286, Nov. 13, 1985 and JP60127067 (Kubota Tekko KK), Jul. 6, 1985.

Patent Abstracts of Japan, vol. 12, No. 73, Mar. 8, 1988 and JP62214863 (Nippon Chuzo KK), Sep. 21, 1987.

(Continued)

*Primary Examiner*—Jennifer McNeil
*Assistant Examiner*—Jason Savage
(74) *Attorney, Agent, or Firm*—Fitch, Even, Tabin & Flannery

(57) ABSTRACT

Composite wear component produced by casting and consisting of a metal matrix whose working face or faces includes inserts which have a very high wear resistance, characterized in that the inserts consist of a ceramic pad, this ceramic pad consisting of a homogeneous solid solution of 20 to 80% of $Al_2O_3$ and 80 to 20% of $ZrO_2$, the percentages being expressed by weights of the constituents, and the pad then being impregnated with a liquid metal during the casting.

22 Claims, 1 Drawing Sheet

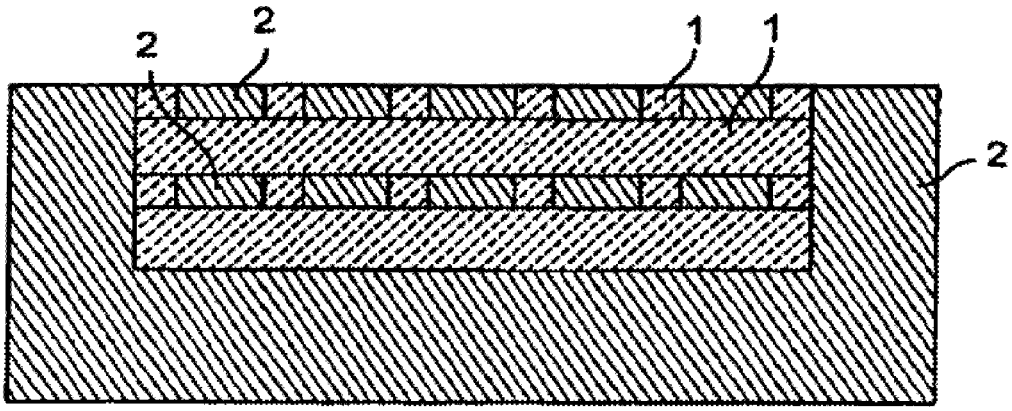

US00RE39998C1

(12) EX PARTE REEXAMINATION CERTIFICATE (10007th)

United States Patent
Francois

(10) Number: US RE39,998 C1
(45) Certificate Issued: Jan. 13, 2014

(54) COMPOSITE WEAR COMPONENT

(75) Inventor: Hubert Francois, Ans (BE)

(73) Assignee: Magotteaux International S.A., Vaux-Sous-Chevremont, Liege (BE)

Reexamination Request:
No. 90/012,717, Nov. 8, 2012

Reexamination Certificate for:

| | |
|---|---|
| Patent No.: | **Re. 39,998** |
| Issued: | **Jan. 8, 2008** |
| Appl. No.: | **10/448,004** |
| Filed: | **May 30, 2003** |

Certificate of Correction issued Jul. 22, 2008

Related U.S. Patent Documents

Reissue of:

| | |
|---|---|
| (64) Patent No.: | **6,399,176** |
| Issued: | **Jun. 4, 2002** |
| Appl. No.: | **09/269,723** |
| PCT Filed: | **Aug. 27, 1997** |
| PCT No.: | **PCT/EP97/04762** |
| § 371 (c)(1), (2), (4) Date: | **Jun. 1, 1999** |
| PCT Pub. No.: | **WO98/15373** |
| PCT Pub. Date: | **Apr. 16, 1998** |

(30) Foreign Application Priority Data

Oct. 1, 1996 (EP) ..... 96202741
Jul. 4, 1997 (EP) ..... 97870099

(51) Int. Cl.

| | |
|---|---|
| ***B24D 3/34*** | (2006.01) |
| ***B32B 15/01*** | (2006.01) |
| ***C22C 1/10*** | (2006.01) |
| ***C23C 4/10*** | (2006.01) |
| *F16J 9/00* | (2006.01) |

(52) U.S. Cl.
CPC ..... *B32B 15/01* (2013.01); *C22C 1/1036* (2013.01); *C23C 4/105* (2013.01)
USPC ..... 428/67; 51/307; 92/129; 428/457; 428/472; 428/539.5; 428/545; 428/610; 428/614; 428/615; 428/702

(58) Field of Classification Search
None
See application file for complete search history.

(56) References Cited

To view the complete listing of prior art documents cited during the proceeding for Reexamination Control Number 90/012,717, please refer to the USPTO's public Patent Application Information Retrieval (PAIR) system under the Display References tab.

*Primary Examiner* — Timothy J Kugel

(57) ABSTRACT

Composite wear component produced by casting and consisting of a metal matrix whose working face or faces includes inserts which have a very high wear resistance, characterized in that the inserts consist of a ceramic pad, this ceramic pad consisting of a homogeneous solid solution of 20 to 80% of $Al_2O_3$ and 80 to 20% of $ZrO_2$, the percentages being expressed by weights of the constituents, and the pad then being impregnated with a liquid metal during the casting.

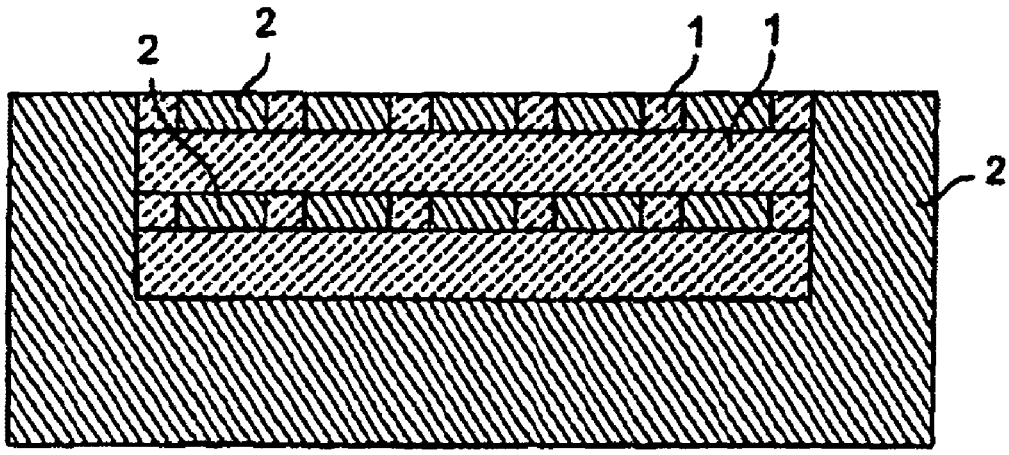

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 1-22 is confirmed.

New claims 23-28 are added and determined to be patentable.

23. Composite wear component produced by classical or centrifugal casting, said composite wear component comprising a metal matrix having a working face or faces including inserts which have wear resistance, the inserts include a porous ceramic pad, wherein the porous ceramic pad comprises a homogeneous ceramic composite of 20 to 80% of $Al_2O_3$ and 80 to 20% of $ZrO_2$, the percentages being expressed by weights of the constituents, and the porous ceramic pad being integrated into the metal matrix by impregnation of a liquid metal in the porous ceramic pad during the casting;

wherein the inserts include an aggregate of composite ceramic grains aggregated with an adhesive that does not exceed 4% by weight relative to the total weight of the pad.

24. Composite wear component according to claim 23, wherein the ceramic material includes from 55 to 60% by weight of $Al_2O_3$ and from 38 to 42% by weight of $ZrO_2$.

25. Composite wear component according to claim 23, wherein the ceramic material includes from 70 to 77% by weight of $Al_2O_3$ and from 23 to 27% by weight of $ZrO_2$.

26. Composite wear component according to claim 23, wherein the content of ceramic materials in the insert is between 35 and 80% by weight.

27. Composite wear component according to claim 23, wherein the inserts include an aggregate of composite ceramic grains which have a particle size within the range F6 to F22 according to the FEPA standard.

28. Composite wear component according to claim 23 produced by casting and composed of a metal matrix including at least two ceramic pads superposed, leaving a gap of the order of 10 mm in order to permit the arrival of the liquid metal.

* * * * *